Figure 1:
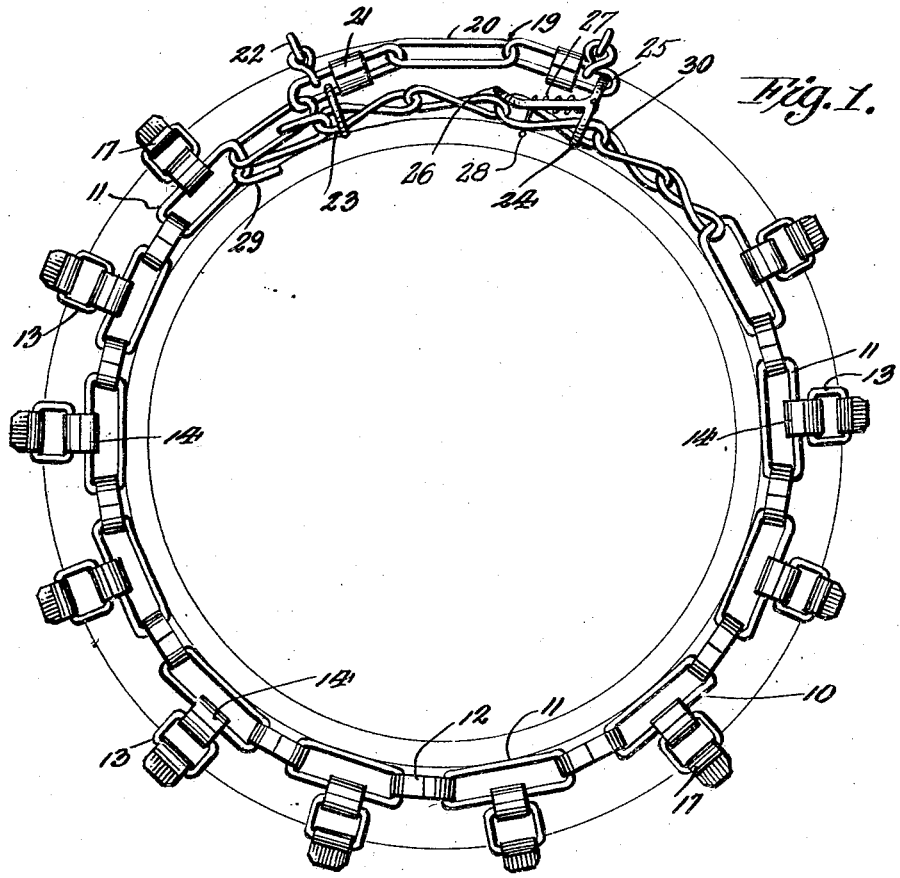

June 24, 1930.  F. ROMAIN  1,768,153
TIRE CHAIN
Filed Oct. 27, 1926  2 Sheets-Sheet 1

WITNESSES

Inventor
FREDERICK ROMAIN
By Richard B. Owen
Attorney

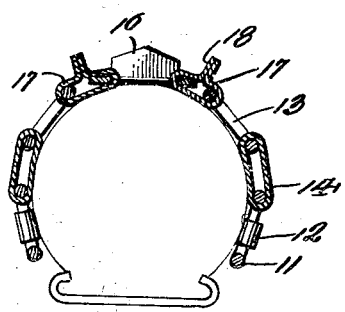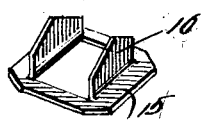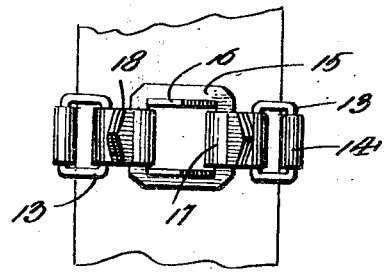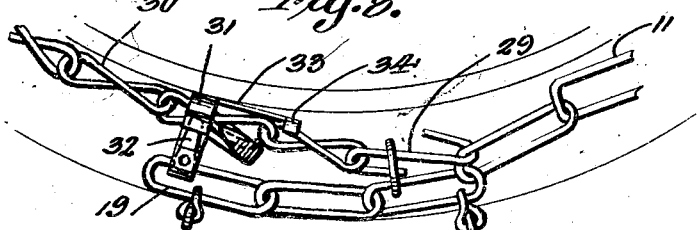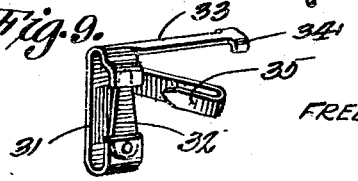

Patented June 24, 1930

1,768,153

UNITED STATES PATENT OFFICE

FREDERICH ROMAIN, OF MARIAS, MONTANA

TIRE CHAIN

Application filed October 27, 1926. Serial No. 144,573.

The present invention relates to improvements in tire chains and has for its primary object to provide chains which may be conveniently positioned for operative engagement on a vehicle tire without the necessity of elevating the vehicle or turning the wheel.

A further object of the invention is the provision of a vehicle tire chain having cross members designed to frictionally engage a road surface to prevent spinning of the wheels.

Another object of the invention is the provision of a tire chain of the above character having an improved chain locking member designed to facilitate the connection of the chain upon a tire.

Still another object of the invention is the provision of a tire chain which is comparatively simple and durable of construction, effective in operation, and which can be manufactured at a comparatively low cost.

Other objects and advantages of the invention will become apparent as the description progresses.

Figure 2:
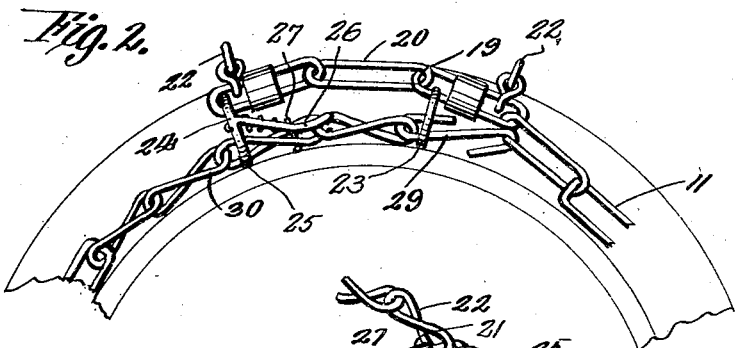
Figure 3:
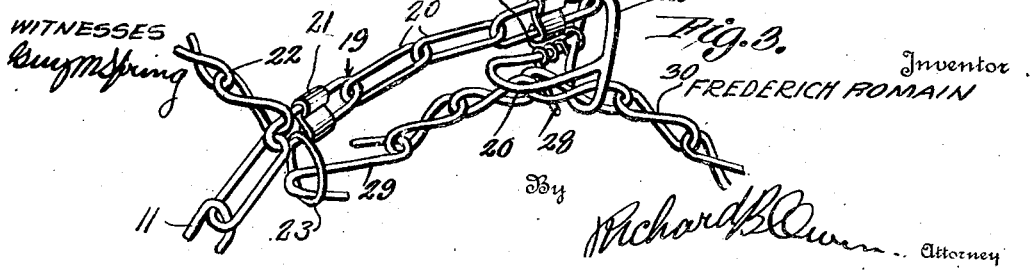

In the accompanying drawings, forming a part of this application and in which like reference characters are employed to designate corresponding parts throughout the same:

Figure 1 is a side elevational view of a vehicle tire showing my improved tire chain operatively mounted thereon, Figure 2 is a fragmentary side elevation of the tire illustrating in detail the preferred construction of my invention, Figure 3 is a perspective view indicating a connecting chain unit, Figure 4 is a transverse sectional view of a chain structure shown in operative position upon the tire, Figure 5 is an outer plan view of the cross chain structure, Figure 6 is a perspective view of the ground engaging plate, Figure 7 is a perspective view of a connecting member, Figure 8 is a fragmentary side elevational view of the connecting chain unit, illustrating a modified form of the invention, and Figure 9 is a perspective view of the modified form of the locking member.

Referring to the drawings, wherein for the purpose of illustration are shown two forms of my present invention, the numeral 10 generally designates the major portion of the tire chain composed of a plurality of elongated rectangular shaped side links 11, connected by a series of connecting bands 12. The sides are adapted to suitably support a plurality of spaced transversely extending cross chain units comprising rectangular shaped end links 13 connected by means of bands 14 with the side links 11, and a central plate 15 which is of generally rectangular construction and has a pair of pointed lugs or cleats 16 struck from its central portion. These cleats project outwardly and are adapted to securely engage the road bed. A pair of connecting band units 17 are positioned about the end links 13 and the central plate 15, these connecting bands being provided with parallel contacting tapered lugs 18 at their outer central portions.

It is thus apparent, that the major tire chain section 10 includes a pair of continuous side chains and a series of spaced cross chains provided with ground engaging cleats at their central portions, to positively grip the ground and prevent slipping of the wheels.

An important characteristic of my invention resides in the provision of a chain section 19, having one end connected to the chain section 10 to expedite the connection of the chain upon a vehicle wheel. As will be well understood by those familiar with this art, it is customary with the type of chains now commonly employed upon vehicle wheels, to elevate the wheel by means of a jack or other apparatus, to connect the tire chain in position. My improved chain structure is designed to obviate the necessity of elevating the wheel, or turning the same, so that the chain may be applied upon the tire in a stationary position. With this in mind, my invention includes a chain section 19 including a plurality of side links 20 connected, as shown in Figures 1 and 8. The outer links of this section are provided with spacing straps 21, cross chains 22 being connected with the outer ends of the said end links and also formed of link sections. Connected with the end links 20 and arranged to be disposed adjacent the side walls of the tire are a pair of oppositely arranged guide links 23. The opposite end links carry automatic key locking members 24. The preferred form of automatic locking member shown in Figures 1, 2 and 3 embodies an oval shaped loop 25 normally disposed in a radial position against the side wall of the tire and integrally connected extensions 26 which project laterally from the center portion of the loop 25 in the form of a U-shaped guide, this guide member being bent arcuately adjacent its outer end and formed to readily receive a series of chain links therethrough as will be presently seen. Secured to the inner side arm of the U-shaped guide 26 is the coiled spring member 27 fixed to the arm and having a resilient transversely projecting arm 28 disposed in spaced relation from and inwardly of the guide member.

The chain section 19 is formed to permit convenient connection of the chains upon a tire wheel, this being accomplished by disconnecting the clamping member 29 and passing the chain section 30, connected to the clamping member and to one of the main section links 11 through the loop 25 of the locking member and through the guide loop 23. The clamping link 29 is then connected with the opposite link 11 to lock the chain in continuous position about the tire. In the initial position, the cross chain 22 will be disposed adjacent one of the cross chains of the main section. When, however, the vehicle wheel is rotated the chain section 19 is arranged in its proper position as shown in Figure 1, the cross chain 22 being separated and maintained in this separated position by means of the locking member. This is effected by movement of the locking member 25 along the chain 30, the chain passing between the U-shaped guide extension 26 and the spring arm 28. This construction is designed to permit movement of the loop 25 along the chain section 30 in one direction and to prevent opposite movement of the locking member and cross chain.

As shown to advantage in Figures 8 and 9, I have provided a modified form of locking member including a body 31 formed of a flat strip of metal of elongated form having its ends bent inwardly. Passed through the inner side of one of the ends of the body is a tapered resilient tongue 32, one end of the tongue being secured to the body by means of a rivet, the opposite end being normally in contact with the inner side of the opposite end of the body. The body 31 is normally disposed in a radial position against the side wall of the tire as shown in Figure 8 and is formed with a laterally extending arm 33, formed integral with one end of the body and provided at its outer free end with angular guide clips 34 adapted to guide the connecting chain 30. The body 31 is also formed with an angularly extending clip member 35 formed integral with the body and arranged so as to engage the connecting chain 30 when the body 31 is in extended position.

From the foregoing description and the drawings, it will be readily noted that my improved tire chain is primarily designed to facilitate the connection of the chain upon vehicle wheels, and in this connection provides a chain section 19 which is slidably connected upon the connecting chain section 30. The chain section 19 carries a pair of oppositely disposed locking members designed to be slidably actuated on the connecting chain sections in one direction and formed to engage the connecting chain links in an extended position to prevent return movement of the chain section. In the preferred form shown in Figures 1 to 3 of locking member, the chain links are engaged between a U-shaped guide member and a yieldable spring arm which will permit the outer cross chain of the chain section 19 to be moved in proper spaced position but prevent return movement thereof. In the other form, the locking member includes a body engageable with the links of the chain section 19 and arranged to permit slidable movement of the connecting sections therethrough. This form of locking member is provided with a guide arm which regulates the position of the links when passing through the body and a hook member 35 which will engage the links when the locking member is extended in its proper operative position.

It is to be understood that the forms of my invention herewith shown and described are to be taken as the preferred examples of the same, and that various changes as to the shape, size and arrangement of parts may be resorted to without departing from the spirit of the invention and the scope of the invention as claimed.

Having thus described my invention, I claim:

1. In a tire chain of the character described including a chain section having overlapping end portions, a locking member comprising a loop carried by one end portion, a U-shaped guide formed on said loop and extending at substantially right angles thereto, said guide being bent arcuately adjacent its outer end, a gripping means carried by said guide, the remaining end portion passing through said loop and said guide and being engaged by said gripping means, as and for the purposes set forth.

2. In a tire chain of the character described, including a chain section having overlapping end portions, a locking member comprising a loop carried by one end portion, a U-shaped guide formed on said loop and extending at substantially right angles thereto, said guide being bent arcuately adjacent its outer end, a spring fixed upon said guide and having an arm projecting therefrom and extending transversely across said guide, the remaining end portion passing through said loop and said guide and being engaged by said arm, as and for the purposes set forth.

In testimony whereof I affix my signature.

FREDERICH ROMAIN.